United States Patent [19]
Busch

[11] Patent Number: 5,596,272
[45] Date of Patent: Jan. 21, 1997

[54] MAGNETIC SENSOR WITH A BEVELED PERMANENT MAGNET

[75] Inventor: Nicholas F. Busch, Freeport, Ill.

[73] Assignee: Honeywell Inc., Minneapolis, Minn.

[21] Appl. No.: 531,806

[22] Filed: Sep. 21, 1995

[51] Int. Cl.$^6$ .............................. G01B 7/30; G01P 3/488
[52] U.S. Cl. ................... 324/207.21; 324/174; 324/252
[58] Field of Search .................... 324/173, 174, 324/207.2, 207.21, 207.25, 207.26, 235, 251, 252; 338/32 R, 32 H; 307/116; 123/146.5 A, 617; 188/181 R, 181 A

[56] References Cited

U.S. PATENT DOCUMENTS

| | | | |
|---|---|---|---|
| 3,195,043 | 7/1965 | Burig et al. | 324/235 |
| 4,207,519 | 6/1980 | Zatsepin et al. | 324/235 |
| 4,401,944 | 8/1983 | Narimatsu et al. | |
| 4,520,311 | 5/1985 | Petr et al. | |
| 4,524,932 | 6/1985 | Badziak. | |
| 4,745,363 | 5/1988 | Carr et al. | 324/207.2 |
| 4,970,463 | 11/1990 | Wolf et al. | 324/207.2 |
| 5,341,097 | 8/1994 | Wu | 324/207.2 |
| 5,477,143 | 12/1995 | Wu | 324/207.21 |

FOREIGN PATENT DOCUMENTS

| | | | |
|---|---|---|---|
| 168381 | 9/1984 | Japan | 324/207.21 |
| 227116 | 11/1985 | Japan | 324/207.2 |

*Primary Examiner*—Gerard R. Strecker
*Attorney, Agent, or Firm*—William D. Lanyi

[57] ABSTRACT

A magnetic sensor is provided with a permanent magnet that has a beveled surface at one end of the magnet. The beveled surface intersects a first pole face at a preselected angle. The permanent magnet is associated with a magnetically sensitive component that comprises first and second magnetoresistive elements. Both of the magnetoresistive elements comprise two magnetoresistors. The four magnetoresistors are connected in electrical communication with each other to form a Wheatstone bridge that provides an output signal representative of the magnetic field strength in the sensing plane of the magnetically sensitive component. The beveled magnet provides a magnetic field which relates to a magnetically sensitive component in such a way that the position of a magnetic null in the sensing plane is advantageously affected.

13 Claims, 14 Drawing Sheets

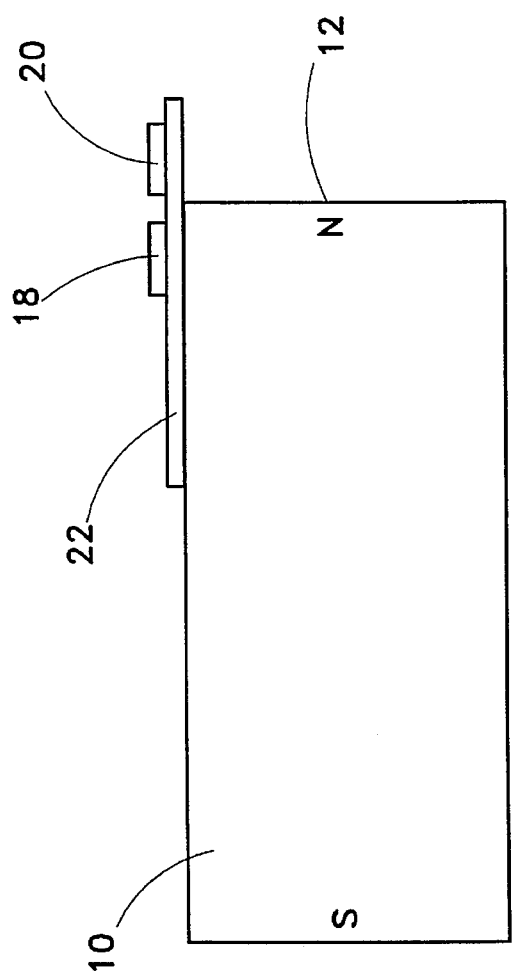
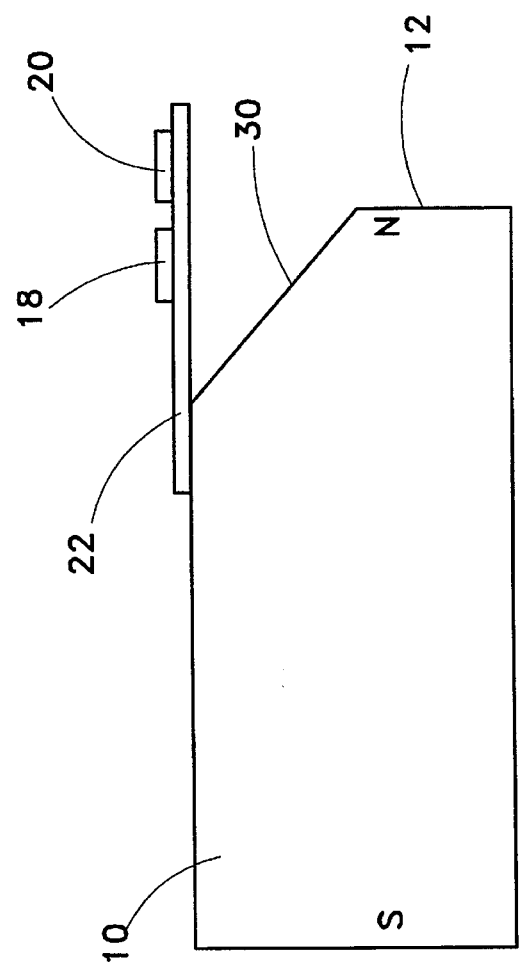

| BEVELED MAGNET | | | BLOCK MAGNET | | |
|---|---|---|---|---|---|
| Z | SLOT | TOOTH | Z | SLOT | TOOTH |
| 0.40 | −50.90 | −126.70 | 0.40 | −54.60 | −129.80 |
| 0.50 | −41.40 | −114.50 | 0.50 | −43.90 | −116.70 |
| 0.60 | −31.10 | −102.30 | 0.60 | −33.30 | −105.00 |
| 0.70 | −20.60 | −89.90 | 0.70 | −22.00 | −91.50 |
| 0.80 | −9.10 | −77.30 | 0.80 | −10.20 | −77.30 |
| 0.90 | 1.80 | −63.60 | 0.90 | 2.30 | −63.30 |
| 1.00 | 13.80 | −49.60 | 1.00 | 14.60 | −49.20 |
| 1.10 | 26.00 | −35.70 | 1.10 | 26.80 | −35.00 |
| 1.20 | 37.50 | −21.80 | 1.20 | 40.10 | −19.90 |
| 1.30 | 50.30 | −7.40 | 1.30 | 52.50 | −5.70 |
| 1.40 | 62.40 | 6.70 | 1.40 | 64.50 | 8.50 |

MAGNETIC SENSOR WITH A BEVELED PERMANENT MAGNET

BACKGROUND OF THE INVENTION

1. Field of the Invention

The present invention is generally related to a magnetic sensor that utilizes a magnetically sensitive component in combination with a permanent magnet to sense the presence or absence of a ferromagnetic object in a detection zone and, more particularly, to a magnetic sensor that incorporates a permanent magnet which has a beveled surface formed at one end of the magnet.

2. Description of the Prior Art

Many different types of magnetic sensors are known to those skilled in the art. Certain magnetic sensors utilize a permanent magnet to provide a bias magnetic field that is distorted when a ferromagnetic object moves through a preselected detection zone. The distortion of the magnetic field is sensed by a magnetically sensitive component which provides an output signal that changes to indicate the presence or absence of the ferromagnetic object within the detection zone. A common application of this type of sensor is in a geartooth sensor used in automotive applications. Sensors of this type can be used in the timing apparatus of an automobile engine and, alternatively, in conjunction with automatic braking systems.

U.S. Pat. No. 4,520,311, which issued to Petr et al on May 28, 1985, discloses a current to pulse-sequence transducer for transforming a current to be measured into a sequence of pulses which has a certain mark-to-space ratio. The transducer includes a first transforming device for transforming the current to be measured into a measurement magnetic field, a second transforming device for generating a reference magnetic field and magnetic field comparison device including a magnetoresistive thin film comparator normally providing a zero output when the fields are equal, but generating an impulse when the strength of one magnetic field exceeds that of the other. In addition, the device comprises an impulse processing device. The impulse processing device includes a differentiator amplifier connected to the output of the magnetoresistive thin film comparator and a Schmitt trigger circuit postcoupled to the differentiator amplifier.

U.S. Pat. No. 4,524,932, which issued to Bodziak on Jun. 25, 1985, describes a railroad car wheel detector using a Hall effect element. The element is incorporated into an integrated circuit unit with temperature compensation. It also includes voltage regulation and amplification and is mounted on top of a permanent magnet made of ceramic material with the critical Hall axis aligned with the magnet pole axis. In order to avoid saturating the Hall cell, it is positioned within a pole-to-pole hole in the magnet which creates a flux null space.

U.S. Pat. No. 4,401,944, which issued to Narimatsu et al on Aug. 30, 1983 discloses a displacement detector having first and second magnetoresistive elements with a bias field at 45 degrees to each element. The apparatus includes first and second magnetoresistive elements having respective angularly disposed current path portions through which a bias current flows and to which a bias magnetic field is supplied. An external magnetic signal field is supplied from a magnetic source and the magnetoresistive elements are relatively displaced with respect to the source. The bias field is supplied at an angle of approximately 45 degrees with respect to the direction in which the bias current flows in each current path. The source of external magnetic field generates a signal field whose polarity gradually decreases and then changes over to an opposite polarity at a boundary region.

U.S. Pat. No. 5,477,143 which was issued on Dec. 19, 1995 to Wu and assigned to the Assignee of the present application, discloses a proximity sensor that is provided with two magnetoresistive elements that are disposed in a common plane and displaced from a lateral surface of a permanent magnet. The common sensing plane of the magnetoresistive elements extends in a direction generally parallel to a magnetic axis of a permanent magnet that extends between the north and south poles of the magnet. A detection zone is defined relative to a preselected magnetic pole face and the magnetoresistive elements provide first and second signals that can be compared to define a third signal which is representative of the presence or absence of the magnetically permeable object within the detection zone. The magnetoresistive elements can each comprise a plurality of magnetoresistors which are arranged in a Wheatstone bridge configuration for the purpose of providing the first and second signals described above.

Regardless of the specific type of magnetic sensor used, certain characteristics are important to the operation of the sensor. One of the most important characteristics of a magnetic sensor is the distinctiveness of its output signal with regard to the presence and absence of a ferromagnetic object in the detection zone. For example, a very slight change in the magnitude of the sensor's output signal could possible create difficulty in the precise identification of the leading edge of the ferromagnetic object as it moves past the face of the sensor. In many automotive applications, it is necessary for the sensor to be able to accurately and precisely identify the location of the ferromagnetic object as it moves through the detection zone. In common applications of magnetic sensors that are used as geartooth sensors, the ferromagnetic objects that move through the detection zone are the teeth of a rotatable gear. It is therefore advantageous if a magnetic sensor can be provided with certain operational characteristics that enhance its ability to perform these detection functions.

It would be beneficial if a sensor could be provided with the characteristic of switching its output at precisely the same target angular position even though there may exist variation in the relative position between the sensor assembly and the target. This variation in the relative positions of the target and the sensor result from the normal variations that exist because of manufacturing tolerances. For example, automobile engines are not identical to each other regardless of the efforts made to achieve this goal. In addition, there exists slight dimensional differences between individual sensors regardless of the manufacturing tolerances used during production. In addition, the relative positions of the sensor and the target can change because of variations in temperature and the effects of thermal expansion. The variation in the air gap between a geartooth sensor and a rotatable target is typically between 0.10 millimeters and 1.5 millimeters.

SUMMARY OF THE INVENTION

In order to improve the operational characteristics of a magnetic sensor, the present invention utilizes a permanent magnet that is provided with a beveled surface that improves the operation of its related magnetically sensitive component. A preferred embodiment of the present invention comprises a magnetically sensitive component which has a sensing plane. In a particularly preferred embodiment of the present invention, the magnetically sensitive component comprises magnetoresistors that are disposed in the sensing plane. As is well known to those skilled in the art, magnetoresistors are sensitive to the magnitude of a magnetic field that lies within the sensing plane. The present invention also comprises a permanent magnet that has a first magnetic pole face, a second magnetic pole face and a magnetic axis that extends perpendicularly through the planes of the first and second magnet pole faces. The magnetically sensitive component is displaced from the magnetic axis with the sensing plane being disposed in parallel association with the magnetic axis. The permanent magnet has a beveled surface that is formed in a first end of the permanent magnet. The beveled surface intersects the first pole face at a preselected angle and is disposed proximate the magnetically sensitive component.

In one embodiment of the present invention, the magnetically sensitive component comprises at least first and second magnetoresistive elements. In some embodiments, the first and second magnetoresistive elements each comprise two magnetoresistors that are arranged in nested serpentine patterns that are known to those skilled in the art. The first magnetoresistive element comprises first and second magnetoresistors and the second magnetoresistive element comprises third and fourth magnetoresistors. The first, second, third and fourth magnetoresistors are connected in electrical communication with each other to form a Wheatstone bridge configuration. The first, second, third and fourth magnetoresistors are made of a permalloy material in a particularly preferred embodiment of the present invention. The present invention further comprises a movable ferromagnetic object that is disposed for movement through a detection zone proximate the magnetically sensitive component. In certain applications of the present invention, the ferromagnetic object is a tooth of a gear and the gear is rotatably attached to an automobile engine.

BRIEF DESCRIPTION OF THE DRAWINGS

The present invention will be more fully and completely understood from a reading of the Description of the Preferred Embodiment in conjunction with the drawings, in which:

FIG. 4 shows a conventional permanent magnet associated with a magnetically sensitive component;

FIG. 5 shows a magnetically sensitive component associated with a magnet made in accordance with the present invention;

DESCRIPTION OF THE PREFERRED EMBODIMENT

Figure 1:
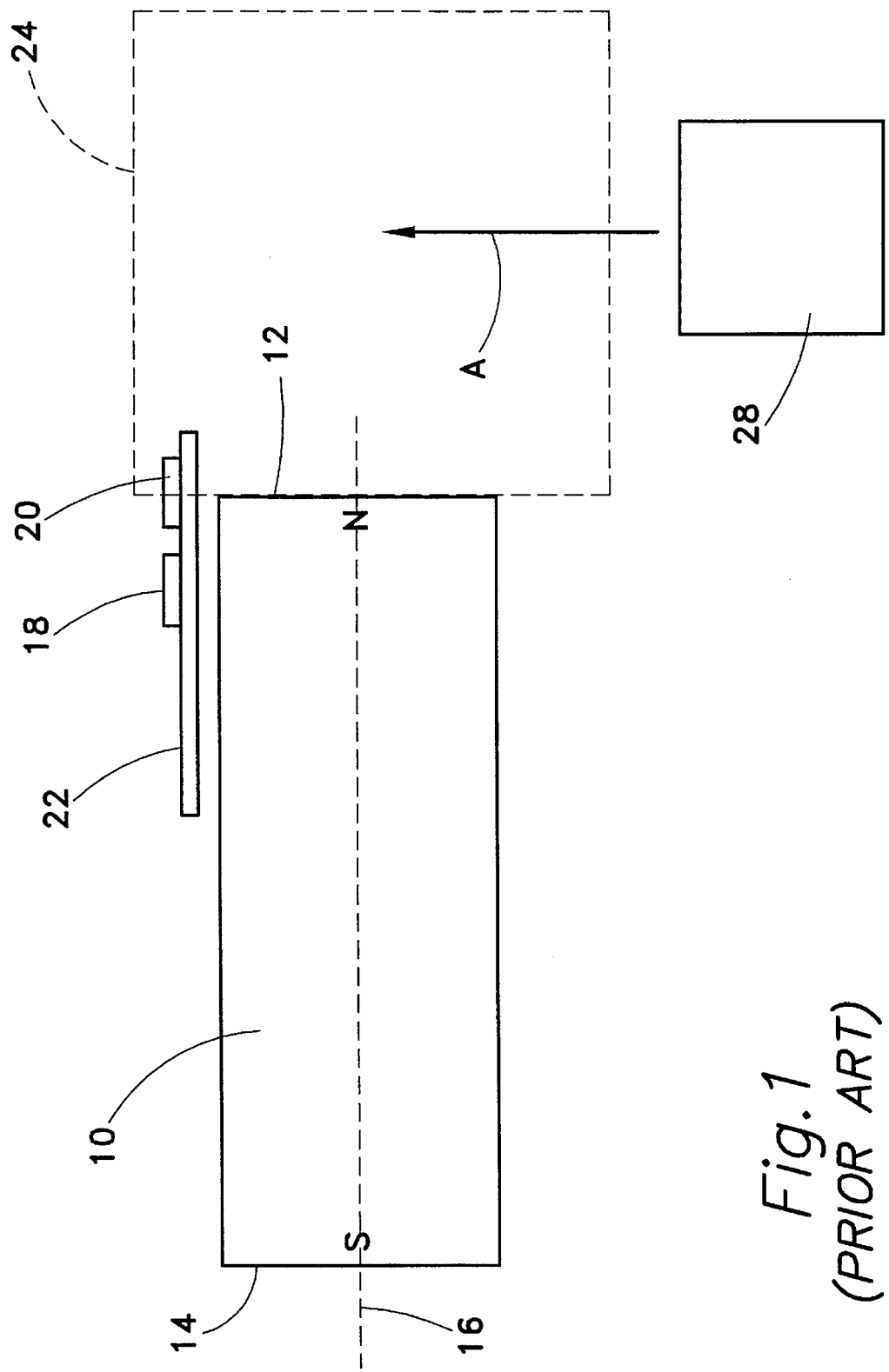
FIG. 1 shows a magnetic sensor made in accordance with principles known to those skilled in the art.

Throughout the Description of the Preferred Embodiment, like components will be identified by like reference numerals.

FIG. 1 shows a known configuration of a magnetic sensor that can be used for detection of a ferromagnetic object moving through a detection zone. It comprises a permanent magnet 10 that has a first pole face 12 and a second pole face 14. The permanent magnet 10 has a magnetic axis 16 that extends through the planes of the first and second pole faces. The magnetic axis 16 will be used in the Description of the Prior Art and in the Description of the Preferred Embodiment of the present invention for the purpose of geometrically defining the positions of the various components of the sensor. In the particular sensor shown in FIG. 1, which is generally similar to that which is described and claimed in U.S. patent application filed by Wu and described above, a magnetically sensitive component, which comprises two magnetoresistive elements, 18 and 20, is disposed proximate a lateral surface of the permanent magnet 10 and in a sensing plane that is generally parallel to the magnetic axis 16. The magnetically sensitive component is disposed on a substrate 22. Although the relative positions of the magnetically sensitive component and the permanent magnet 10 can vary in the possible configurations of the sensor, one particular configuration disposes the first and second magnetoresistive elements, 18 and 20, at a position where the plane of the first pole face 12 intersects one of the magnetically sensitive elements.

With continued reference to FIG. 1, the dashed line box 24 represents a detection zone through which a ferromagnetic object 28 can pass in the direction represented by arrow A. When the ferromagnetic object 28 moves through the detection zone 24, its presence within the zone distorts the magnetic field provided by the permanent magnet 10. The magnetically sensitive component senses the magnitude of the magnetic field in the sensing plane of the first and second magnetoresistive elements and provides an output signal that is representative of that magnitude of magnetic field. Changes in the output signal from the magnetically sensitive component can be detected to determine the present or absence of the object 28 in the detection zone. As can be seen in FIG. 1, the permanent magnet 10 is a parallelepiped.

Figure 2:
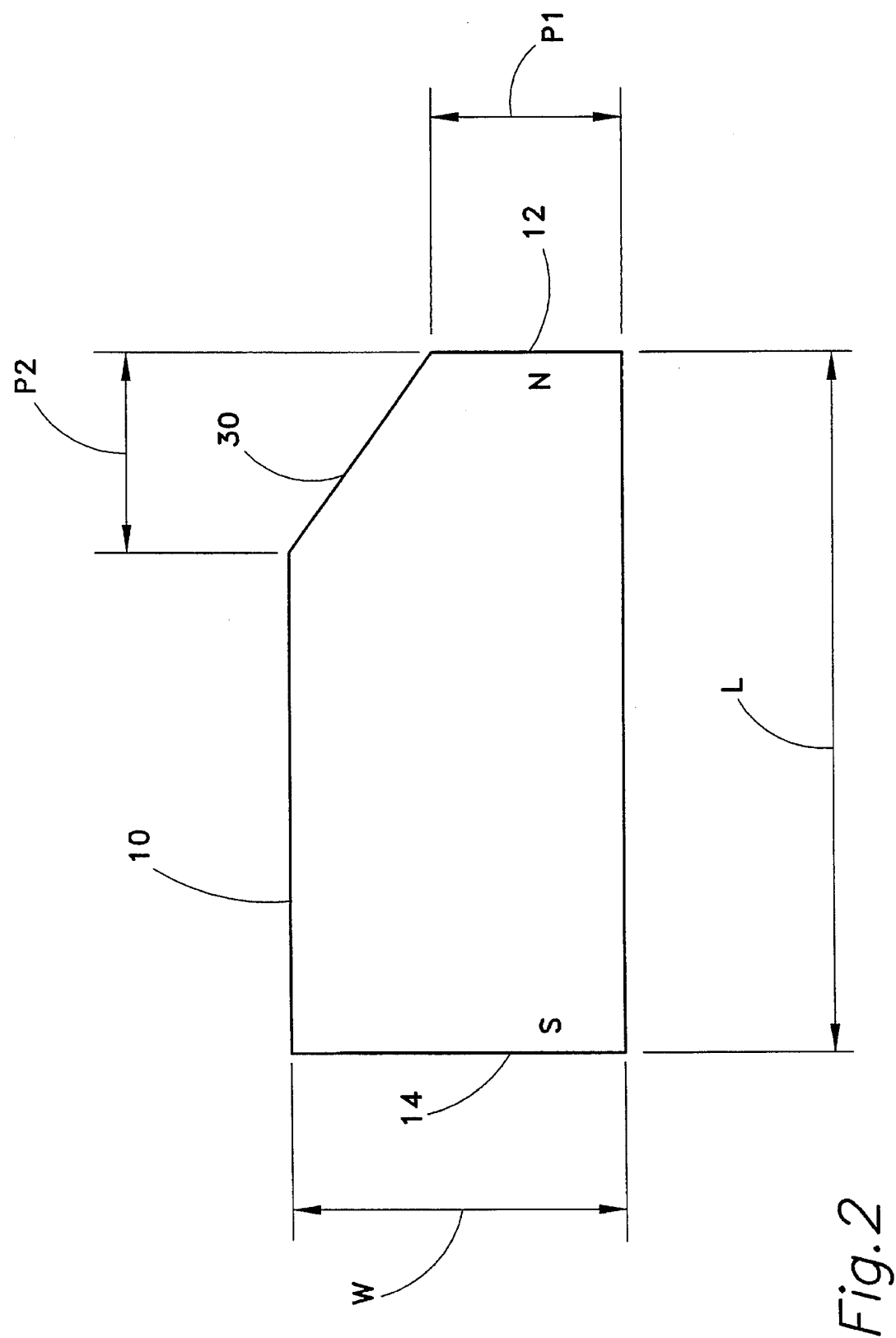
FIG. 2 shows a permanent magnet made in accordance with the principles of the present invention.

The present invention utilizes a permanent magnet 10 that has a beveled surface at one end. FIG. 2 shows a permanent magnet 10 that is shaped in accordance with the principles of the present invention. The permanent magnet has a first pole face 12 and a second pole face 14. The first pole face 12 has a beveled surface 30. The beveled surface 30 intersects the first pole face 12 at a preselected angle. The relative angle of the beveled surface 30 is represented by linear dimensions P1 and P2 in FIG. 2. The magnet has a length L and a width W. In a prototype of the present invention, a magnet was used that had a length L of 10 millimeters, a width W of 3 millimeters and a thickness of 3 millimeters. With reference to FIG. 2, dimension P1 was 1 millimeter and dimension P2 was 2 millimeters. The thickness of the magnet in FIG. 2 is not dimensioned.

Figure 3A:
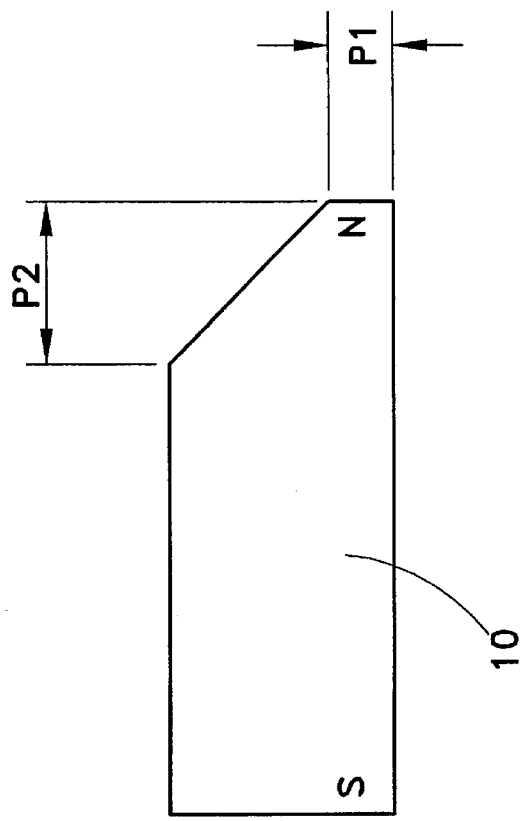
FIGS. 3A and 3B show various alternative shapes of a permanent magnet made in accordance with the present invention.
Figure 3B:
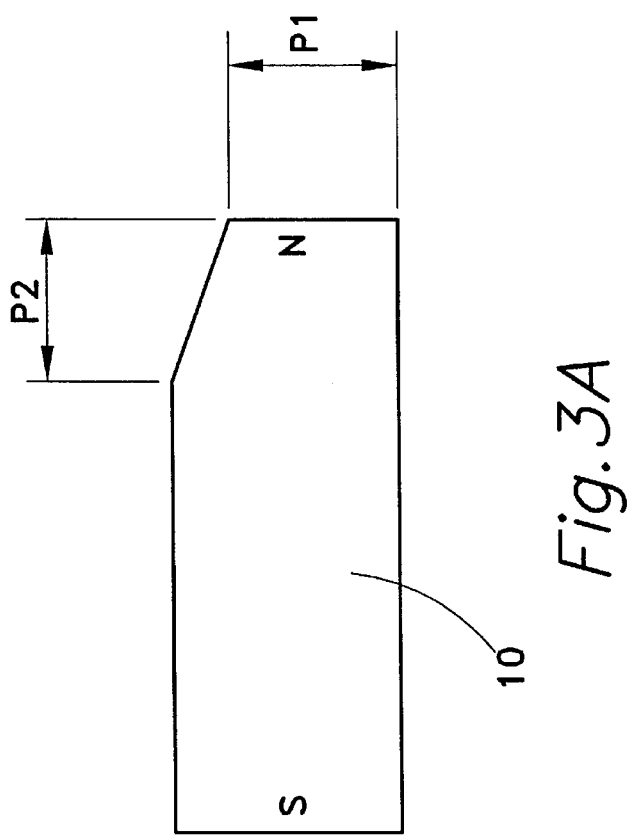

FIGS. 3A and 3B show two possible variations of the permanent magnetic 10 that are within the scope of the present invention. In FIG. 3A, dimension P1 is almost the entire width of the first pole face. In FIG. 3B, dimension P1 is decreased significantly in comparison to its magnitude in FIG. 3A. Depending on the application in which the magnetic sensor is intended for use, the angle between the beveled surface and the first pole face can vary significantly. As will be described below, empirical tests have been run with various magnitudes of dimensions P1 and P2 in order to determine the specific magnetic characteristics that result from these dimensional selections.

FIGS. 4 and 5 are intended to show a comparison of the present invention to a sensor that is known to those skilled in the art and described above in FIG. 1. The sensor shown in FIG. 4 is known to those skilled in the art and the sensor shown in FIG. 5 is made in accordance with the principles of the present invention. The beveled surface 30 formed in the first pole face 12 is disposed proximate the magnetically sensitive component that comprises the first and second magnetoresistive elements, 18 and 20. If the material of the magnets shown in FIGS. 4 and 5 is magnetized to saturation, the magnetic density of the beveled surface 30 will be less than the magnetic flux density of the first pole face 12. The effects on the magnetically sensitive component, when no ferromagnetic object is present in the detection zone, will be different in the two sensors shown in FIGS. 4 and 5. The present invention takes advantage of that difference. With the beveled magnet shown in FIG. 5, the first poleface is calibrated closer to the target than in the standard magnet of the type illustrated in FIG. 4. This permits a greater magnitude of magnetic flux to be imposed on the target. This results in a stronger signal received from the sensor as a result of the target position. In addition, the bevel results in a smaller bias field on the sensing elements. This causes the magnetic signal on the sensor to have a more significant effect. These two characteristics of the present invention, taken together, result in an improved sensor performance with less switch point variation over a larger variation in airgap between the sensor and the target.

Figure 6:
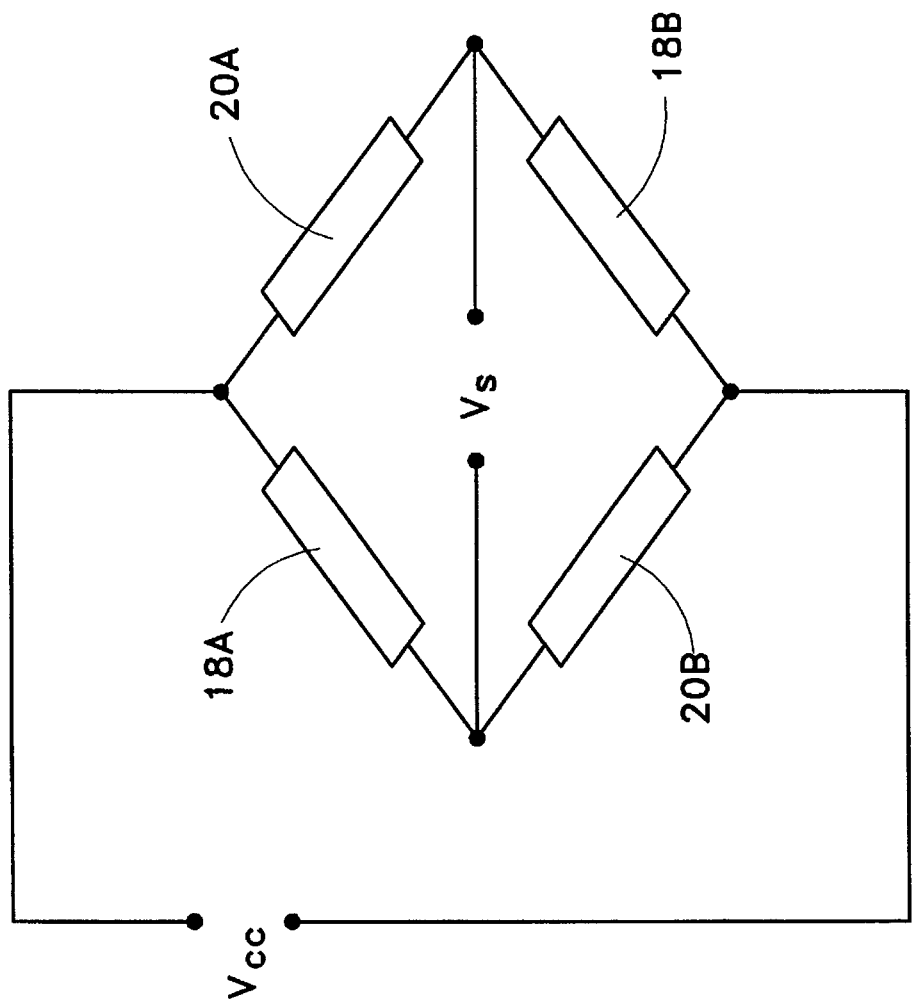
FIG. 6 shows a conventional Wheatstone bridge arrangement of magnetoresistors.

Before describing the beneficial effects that result from the beveled surface of the present invention in detail, it is helpful to understand the type of signals provided by the magnetically sensitive component. FIG. 6 shows a known arrangement of magnetoresistors. The four magnetoresistors, 18A, 18B, 20A and 20B, are connected in electrical communication with each other to form a Wheatstone bridge arrangement. The magnetoresistive elements, 18 and 20, of either FIG. 4 or FIG. 5 can be connected as shown in FIG. 6. Magnetoresistive element 18 comprises two magnetoresistors, 18A and 18B. Similarly, magnetoresistive element 20 comprises two magnetoresistors, 20A and 20B. It should be understood that in one particular embodiment of the present invention, magnetoresistors 18A and 18B are arranged in a nested serpentine pattern to form magnetoresistive element 18 and magnetoresistors 20A and 20B are arranged in a nested serpentine pattern to form magnetoresistive element 20. If a voltage $V_{CC}$ is connected as shown in FIG. 6, an output signal voltage $V_S$ will reflect the changes in the resistance of the magnetoresistors in response to changes in the magnitude of the magnetic field that extends within the sensing plane of the magnetically sensitive component. Since these concepts relating to FIG. 6 are well known to those skilled in the art, they will not be described in great detail herein. The advantages of a magnetic sensor that places the magnetically sensitive components in parallel with the lateral surface of the magnet and offset with respect to a pole face of the permanent magnet will not be described in detail herein. This type of sensor is described and claimed in the United States Patent application filed by Wu which has been identified above.

Figure 7:
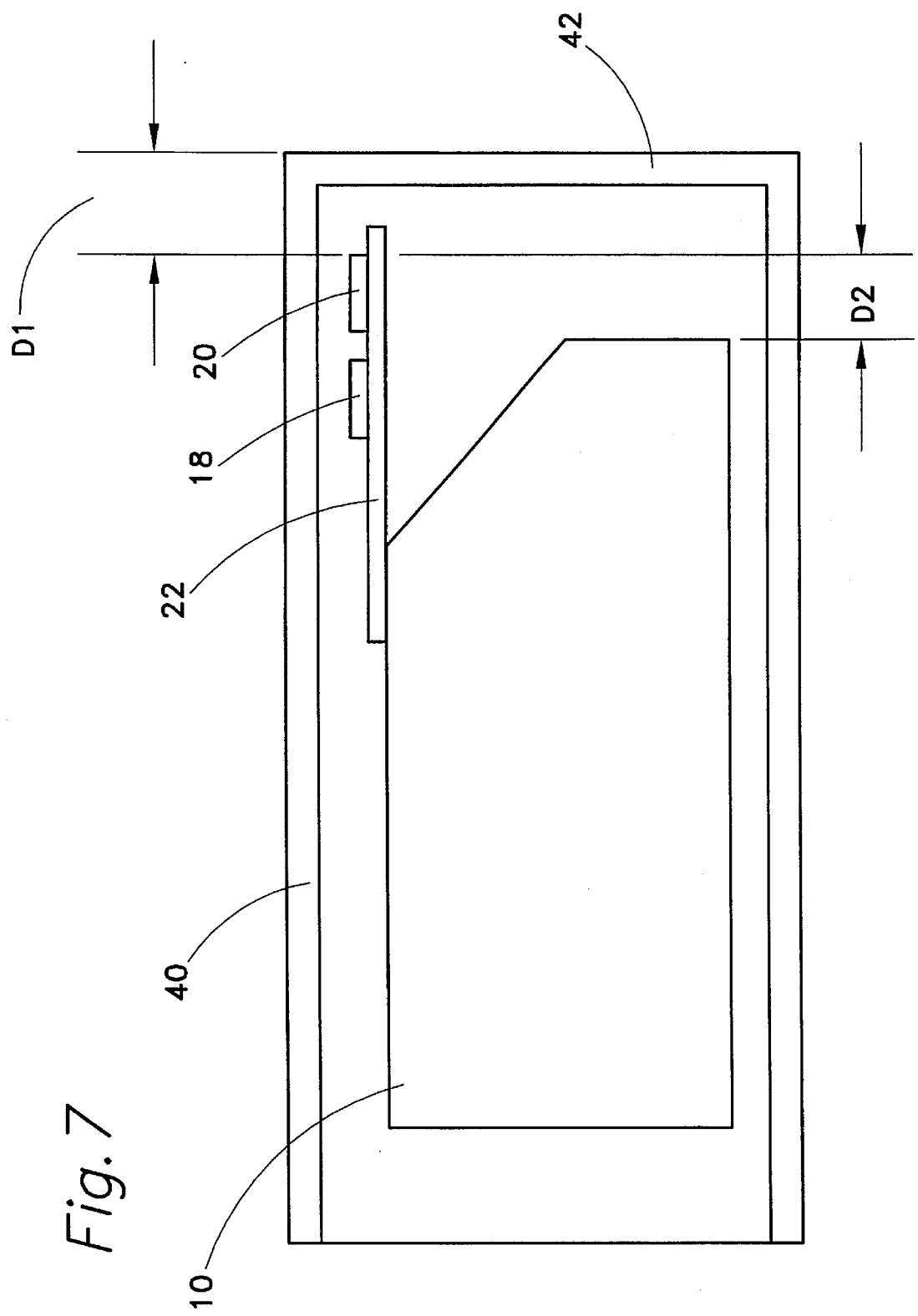
FIG. 7 shows the present invention disposed within a housing structure.

FIG. 7 shows a magnetic sensor made in accordance with the principles of the present invention and disposed within a housing 40 that has an end face 42. The distance from the surface of the end face 42 to a preselected location of the magnetically sensitive component is identified as D1 in FIG. 7. In general it is recommended that dimension D2 be as small as possible so that the magnet is able to be placed as close as possible to the target. The target is magnetically energized by the magnet and produces the signal which the sensing elements detect. Therefore, with the magnet placed closer to the target, a large signal will be produced. The bevel of the magnet allows the first pole face to be placed closer to the target while providing the proper bias to the magnetic sensing elements.

Figure 8:
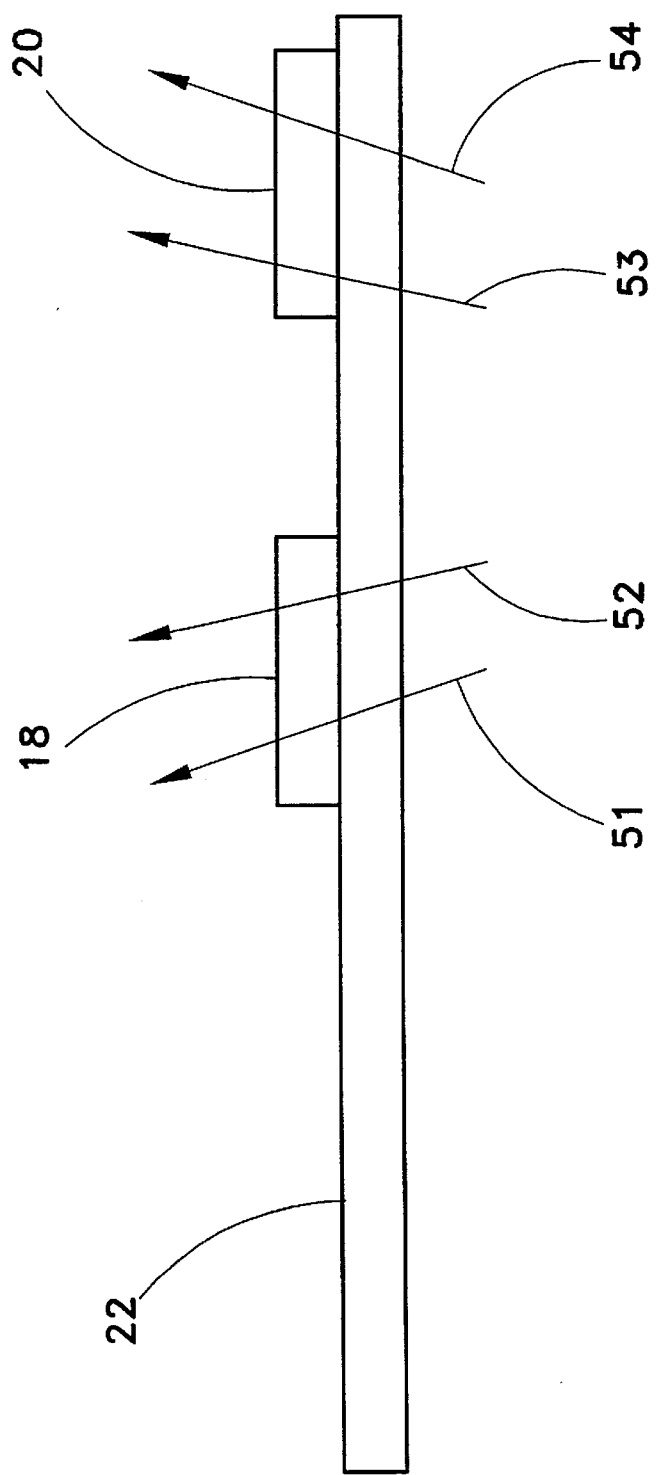
FIG. 8 shows a conventional magnetically sensitive component.

FIG. 8 shows the first and second magnetoresistive elements, 18 and 20, on the substrate 22. In addition, four arrows, 51–54 are shown extending through the magnetoresistive elements. Arrows 51 and 52 represent the direction of the magnetic field provided by the permanent magnet and extending through the first magnetoresistive element 18. Arrows 53 and 54 represent the magnetic field extending from the permanent magnet and through the second magnetoresistive element 20. By appropriately placing the magnetically sensitive component at a position relative to the permanent magnet, a position can be selected in which the magnetic field affects the two magnetically sensitive elements in the way that is generally shown in FIG. 8. This concept is described in detail in U.S. Pat. No. 5,477,143 that has been discussed above. The concept shown in FIG. 8 is known to those skilled in the art and permits the magnetically sensitive component to detect changes in the net magnetic field affecting it. As a ferromagnetic object passes through the detection zone of the magnetic sensor, the magnetic field is distorted and the direction of the magnetic field passing through the magnetoresistive elements changes. Since the magnetoresistive elements, 18 and 20, are sensitive to the magnitude of the magnetic field extending in its sensing plane, the horizontal components of the arrows 51–54 will be the effective magnetic field sensed by the Wheatstone bridge arrangement described above in conjunction with FIG. 6. Because the components of arrows 51 and 52 extend in a direction that is opposite to the horizontal component of arrows 53 and 54, an effective magnetic null will exist somewhere within the area of the magnetically sensitive component. The effect of the beveled surface on the pole face of the permanent magnet will be to change the position of the magnetic null and it will change the range of movement of the magnetic null in response to the passage of a ferromagnetic object through the detection zone of the sensor. This is perhaps the most important characteristic of the present invention. In addition, the bevel increases the magnitude of the magnetic field change in response to the change from a tooth to a slot in the detection zone.

Figure 9:
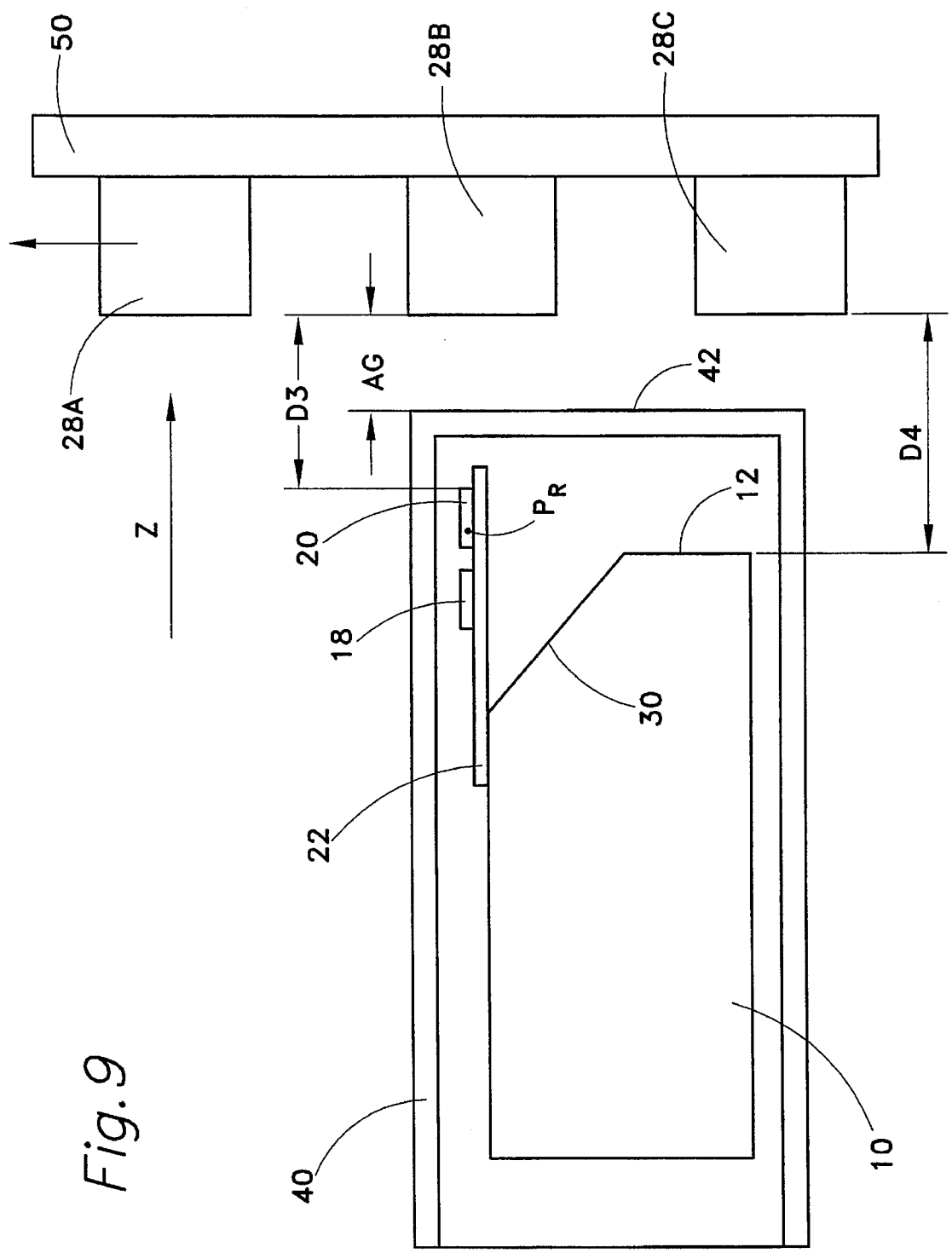
FIG. 9 shows a magnetic sensor made in accordance with the present invention associated with a plurality of ferromagnetic objects.

FIG. 9 shows a magnetic sensor made in accordance with the principles of the present invention arranged in association with several movable ferromagnetic objects, 28A–28C. The ferromagnetic objects, 28A–28C, are attached to a movable structure 50. The ferromagnetic objects are capable of moving in the direction indicated by the arrow in FIG. 9. This movement sequentially disposes individual ferromagnetic objects within the detection zone of the sensor. Although shown as a linear structure in FIG. 9, it should be understood that the plurality of the ferromagnetic objects, 28A–28C, are most commonly individual teeth of a circular gear that are spaced apart by interstitial gaps. Each of the ferromagnetic objects passes through the detection zone and eventually moves into a position where it is separated from the end face 42 of the housing 40 by an air gap AG. Because of the manufacturing and assembly tolerances in most applications of sensors, the magnitude of the air gap AG can vary. It is beneficial to place the magnetically sensitive component and the permanent magnet 10 as close as possible to the path along which the ferromagnetic objects will move. It is important to minimize dimensions D3 and D4 in order to maximize the intensity of the magnetic field on the magnetic sensing elements. When a beveled magnet is used, dimension D4 is smaller than it would be without the use of a beveled magnet.

Figure 10:
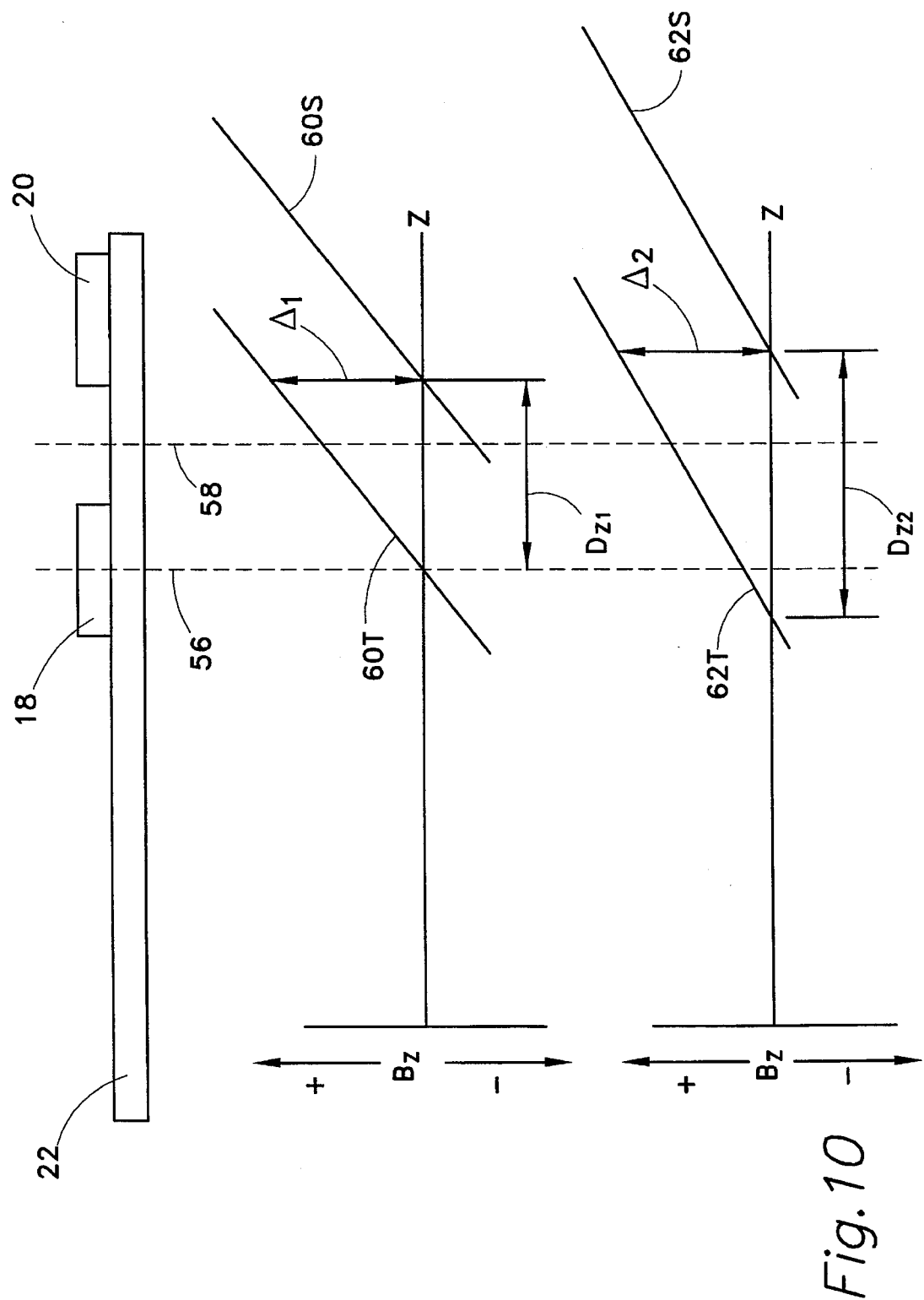
FIG. 10 is a graphical comparison of the magnetic characteristics of a conventional magnetic sensor with the present invention.

FIG. 10 is an exemplary illustration of the first and second magnetoresistive elements, 18 and 20, shown in combination with two graphical representations of the strengths of the magnetic fields in the plane of the magnetoresistive elements, 18 and 20. Dashed lines, 56 and 58, are intended for reference purposes only and their positions in FIG. 10 do not represent precise locations or any particular locations on the substrate 22. In the upper graphical representation of FIG. 10, line 60T shows the magnitude of the magnetic field in the sensing plane as a function of physical position along an axis Z within the sensing plane of the magnetically sensitive component when a ferromagnetic tooth is disposed in the detection zone of the sensor. Line 60S represents this same parameter when a slot is disposed in the detection zone. As can be seen, the magnetic strength in the sensing plane, measured along the horizontal direction of FIG. 10, varies significantly when a tooth is in the detection zone. As an example, the effective magnetic strength is approximately zero in the general vicinity of dashed line 56 which is near the center of magnetoresistive element 18. However, at the same time, the magnetic strength in the region of the second magnetoresistive element 20 is significantly higher when the tooth is in the detection zone. This difference occurs because of the effects described above in conjunction with FIG. 8. The direction of the lines of magnetic flux extending through the sensing plane vary in both direction and magnitude as a function of the horizontal position within the magnetically sensitive component. This same variation of magnetic field strength within the sensing plane exists when a slot is in the detection zone. This variation in magnetic field strength is represented by line 60S. It should be clearly understood that lines 60T and 60S represent the relative strength of the magnetic field in the sensing plane of the magnetically sensitive component when a tooth and a slot, respectively, are in a stationary position within the zone. If the gear is rotating and the teeth and slots sequentially pass through the detection zone, the magnetic strength at any particular position within the sensing plane of the magnetically sensitive component will change. The profile of magnetic strength will sequentially change from that represented by line 60T to that represented by line 60S and then back to the line represented by 60T. This sequence will continue as the teeth and slots pass through the detection zone. For any particular position within the sensing plane, the change in magnetic field strength from a tooth in the detection zone to a slot in the detection zone is represented by $\Delta_1$. The upper graphical representation in FIG. 10 shows the behavior of the magnetic field when a conventional parallelepiped permanent magnet is used. The lower graphical representation in FIG. 10 shows the same type of representation, but when a beveled magnet is used.

With continued reference to FIG. 10, line 62T represents the magnetic strength profile within the sensing plane when a tooth is located in the detection zone of a magnetic sensor made in accordance with the present invention, using a beveled magnet. Line 62S shows the magnetic profile in the sensing plane when a slot is in the detection zone of a magnetic sensor made in accordance with the present invention and using a beveled magnet. By comparing lines 60T and 60S to lines 62T and 62S, several differences can be seen. In addition, a significant similarity can also be seen. The similarity relates to the change in the strength of the magnetic field, between a tooth condition and a slot condition for any specific location within the sensing plane. This change in magnetic field between a tooth condition and a slot condition is represented by $\Delta_2$ in the bottom graphical representation of FIG. 10. In addition, a $\Delta_2$ is larger than $\Delta_1$. Therefore, a greater signal difference between tooth and slot can be obtained. However, as can be seen in the two graphical representations of FIG. 10, the movement of the magnetic null point, where the net magnetic field is equal to zero in the sensing plane, is much greater when a beveled magnet is used as shown in the bottom graphical representation of FIG. 10. This movement $D_{Z2}$ is significantly greater in magnitude than the same magnetic null movement $D_{Z1}$ when a conventional magnet is used. In other words, if the magnetic null within the sensing plane is traced as the teeth and slots move through the detection zone when a conventional magnet is used in a magnetic sensor, the total excursion would extend between the points where line 60T passes through zero magnetic field strength and where line 60S passes through zero magnetic field strength. Using this same criterion, lines 62T and 62S pass through the line of zero magnetic field strength in the sensing plane at points which are spread farther apart. If either DZ1 or DZ2 is too small, the strength of the magnetic field on the sensor is insufficient to cause the digital output of the sensor to switch. As the airgap between the sensor and the target increases due to manufacturing variations, dimensions DZ1 and DZ2 will decrease but, since DZ2 is larger than DZ1, the beveled magnet will operate at larger airgaps than a standard magnet. In addition, over varying airgaps where both magnets are sufficient for appropriate sensor switching, the larger DZ2 dimension results in less switch point variation.

Figure 11:
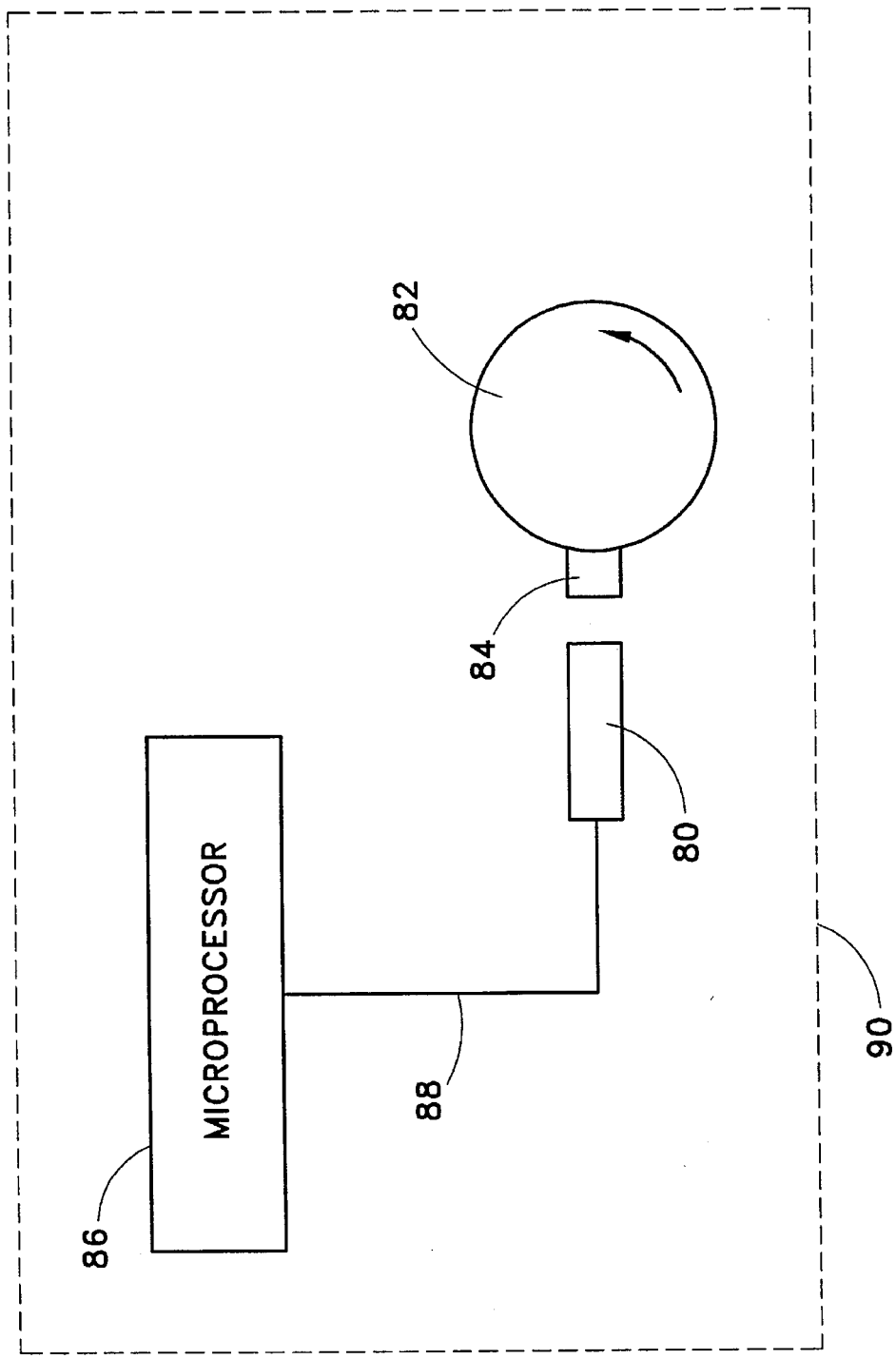
FIG. 11 shows a schematic representation of the present invention in an automotive application.

As described above, magnetic sensors are used in many different types of applications. One particular type of application is in an automobile engine to detect the passage of teeth of a gear through the detection zone of the sensor. In FIG. 11, a geartooth sensor 80 is disposed proximate a rotatable object 82 that has at least one tooth 84 attached to it. The tooth 84 is ferromagnetic and the geartooth sensor 80 is disposed at a location where the tooth 84 can pass through its detection zone. A microprocessor 86 can be used to monitor the changing output signal of the geartooth sensor 80 which is provided on line 88. When used in an arrangement of this type in conjunction with an automobile engine 90 that is represented by the dashed box in FIG. 11, the signals on line 88 can be used by the microprocessor to control the timing of the automobile engine. If an arrangement of this type is used in conjunction with an automatic braking system of an automobile, the rotating member 88 would typically be connected to a wheel of the automobile and a large number of teeth 84 would rotate through a detection zone of a sensor so that the speed of rotation of the wheels can be detected.

Figure 12A:
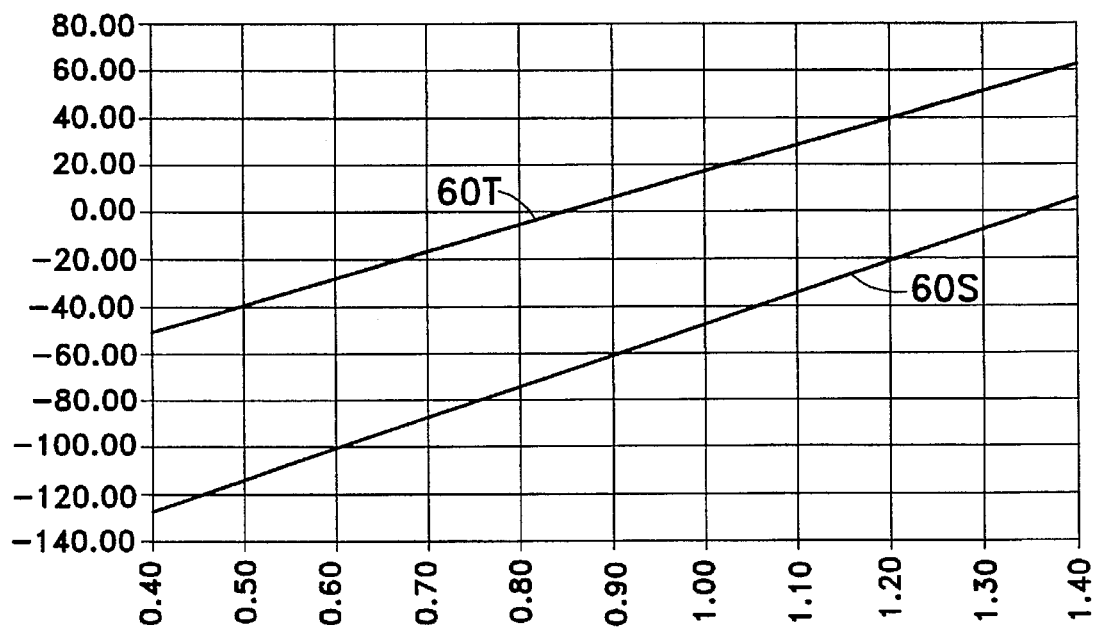
FIGS. 12A and 12B represent the magnetic profile within a sensing place of a magnetically sensitive component for a conventional magnet and a beveled magnet, respectively.
Figure 12B:
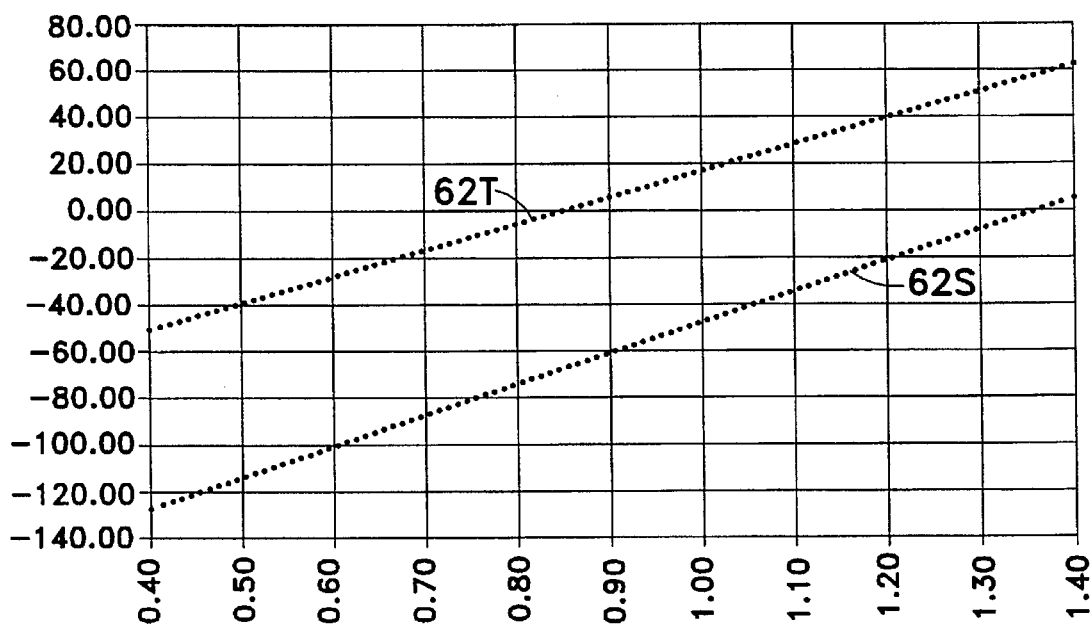
Figures 12C, 13A:
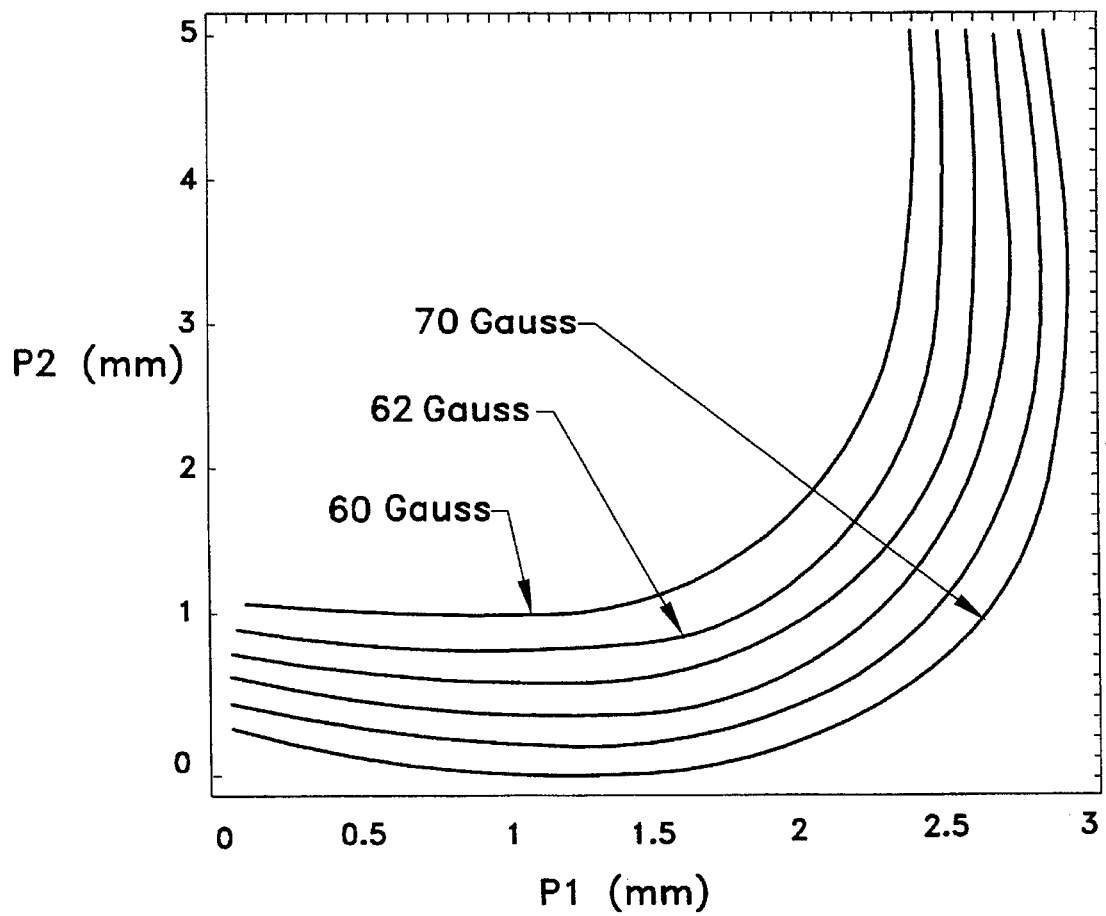
FIG. 12C shows the numeric data used to provide the graphical representations in FIGS. 12A and 12B.
FIGS. 13A and 13B represent the difference in tooth and slot magnetic magnitudes at a chosen point on the sensor element and the field value magnitude when the sensor is observing a slot, respectively.
Figure 13B:
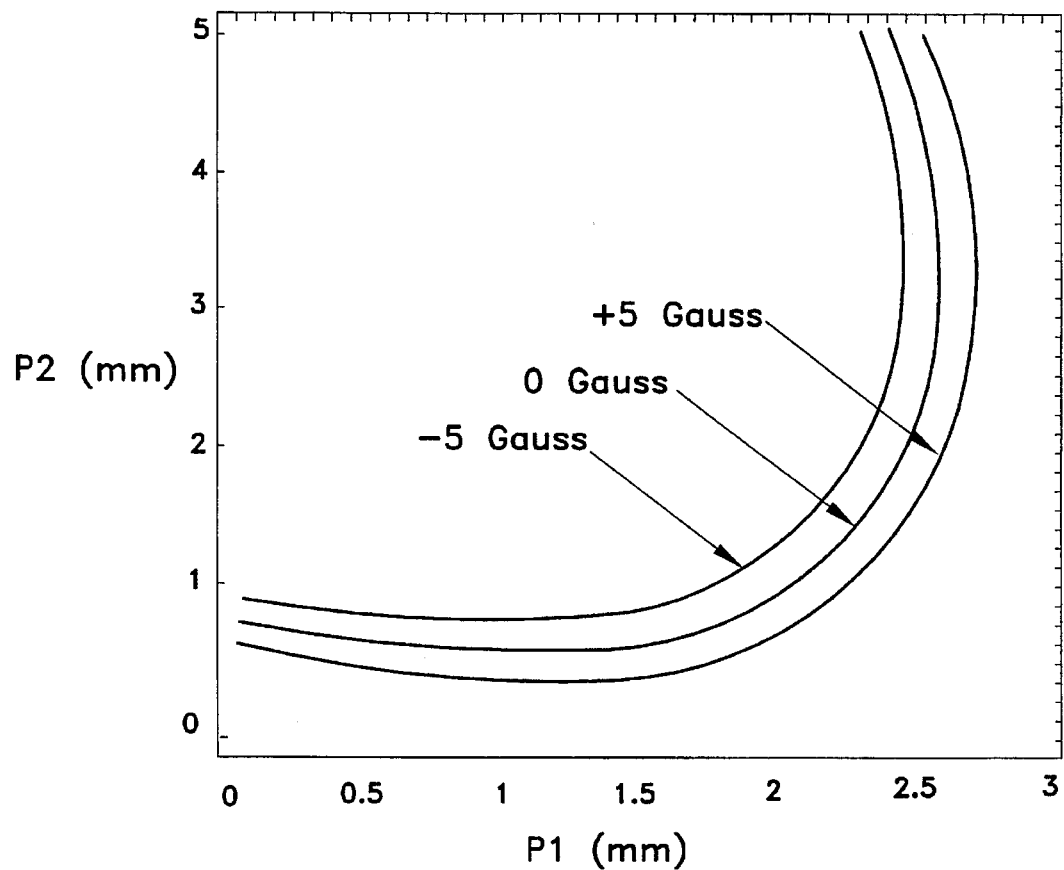

The lines 60T, 60S, 62T and 62S, described above in conjunction with FIG. 10, are shown in FIGS. 12A and 12B. These graphical representations of FIGS. 12A and 12B represent the data shown in FIG. 12C. It should be understood that the slopes of the lines shown in FIG. 10 are exaggerated for the purpose of illustrating the differences between the conventional parallelepiped magnet (60T and 60S) and the beveled magnet of the present invention (62T and 62S). Because of the sensitivity of magnetic sensors, the actual changes in magnitude of the lines of magnetic field strength in the sensing plane, for both teeth and slots, do not change by the exaggerated magnitudes shown in FIG. 10. Instead, FIG. 12A shows the same lines, 60T and 60S, for a magnetic sensor made with a conventional magnet. FIG. 12B show these same magnetic profile lines, 62T and 62S, for a magnetic sensor made with a beveled magnet in accordance with the present invention. However, even though the differences in the slope of the lines and in the location of the magnetic null are relatively small between a conventional magnet and a beveled magnet, these relatively small changes are important in the benefits that they provide. FIG. 13A shows the change in magnetic flux density at a point $P_R$ that exists between observing a tooth and observing a slot at an airgap of 1.5 millimeters. $P_R$ is shown in FIG. 9. FIG. 13B shows the magnetic flux density at a point $P_R$ when observing a slot. Proper operation of the sensor can only occur when the magnetic flux density at $P_R$ is near zero when observing a slot. Therefore, the curve in FIG. 13B representing zero Gauss defines the allowable magnitudes of P1 and P2. The goal of the sensor is to maximize the signal shown in FIG. 13A while maintaining allowable magnitudes of P1 and P2 shown in FIG. 13B. For this particular configuration, the optimum conditions occur with P1 equal to 0 millimeters and P2 equal to 0.6 millimeters.

The information represented in FIGS. 12A, 12B and 12C is the result of simulation programs such as Ansoft Magnetic Model. In the particular modeling process used to provide the information in FIGS. 12A, 12B, 12C, a particular goal of the design process was to minimize the switch point variation over the airgap AG. The optimization criteria focused on the magnetic flux density imparted on the magnetically sensitive component, which was a Wheatstone bridge arrangement of magnetoresistors. The magnetic calibration location was approximately 1.15 millimeters from the sensor face. This placed the magnetic flux density on the magnetoresistor bridge in the Z direction at a zero magnitude at a location that was approximately 0.9 millimeter behind the packaged face when the sensor was observing a slot at a 1.5 millimeter airgap. The horizontal axis in FIGS. 12A and 12B represents the distance, in millimeters, measured along the Z axis in the sensing plane from the sensor face most proximate the target in a direction away from the target. The vertical axes of FIGS. 12A and 12B are measured in gauss. The slope of lines 60T and 60S are 119 Gauss/mm and 138 Gauss/mm, respectively, while the slopes of lines 62T and 62S are 113 Gauss/mm and 133 Gauss/mm, respectively. This reduces sensitivity to air gap variation.

The magnitudes of dimensions P1 and P2, which were described above in conjunction with the Figures, can change the characteristics of a magnetic sensor. For purposes of explanation, various magnitudes of P1 and P2 were selected for simulation. The results are shown in FIG. 13.

Figure 14A:
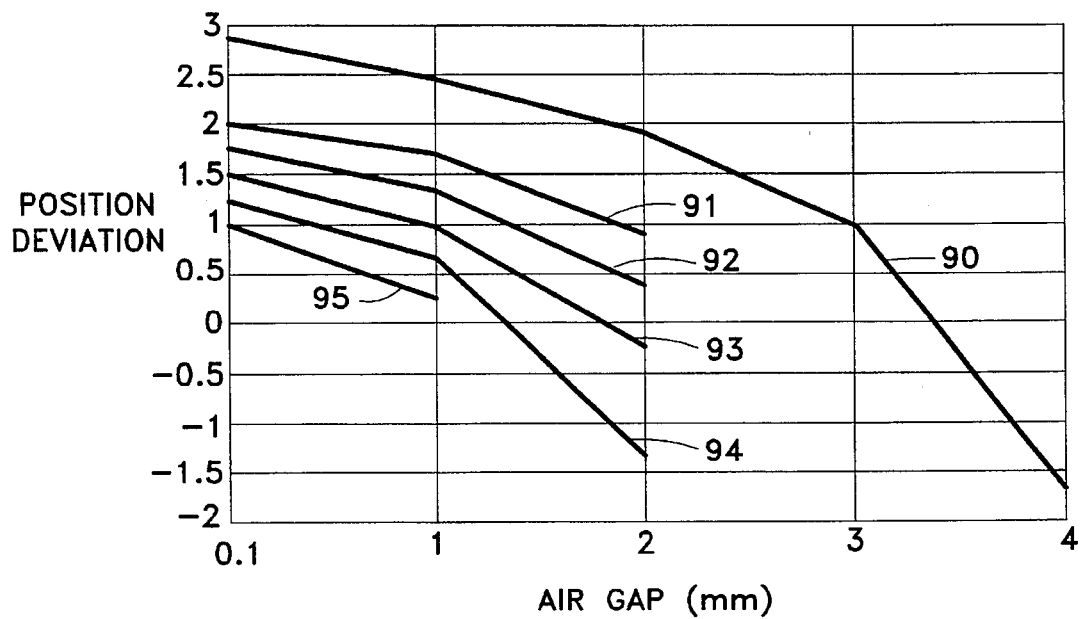
FIGS. 14A and 14B are graphical representation of various switching characteristics for a magnetic sensor made with a conventional magnet and a beveled magnet, respectively.
Figure 14B:
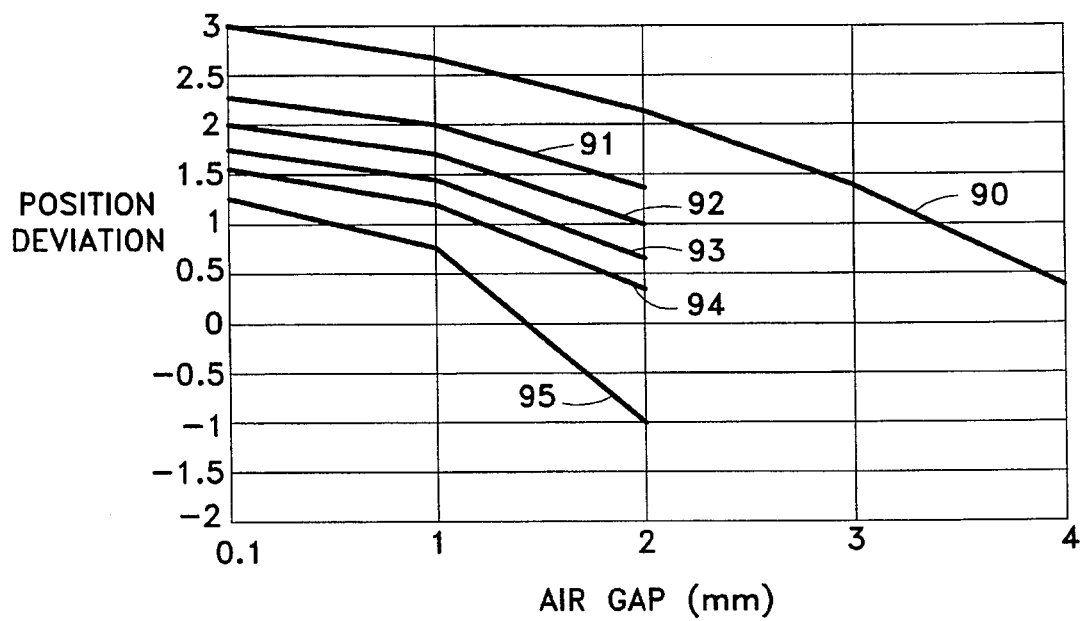

FIGS. 14A and 14B represent the change in calibration position and airgap and the resulting angular switch point. The airgap was varied from 0.1 millimeters to 4 millimeters and the calibration position was varied from 0 mils to 14 mills. It should be understood that the airgap of 0.1 millimeters represents virtual contact between the sensor face and the teeth of the gear, spaced apart by the minimal dimension needed to prevent actual contact. FIGS. 14A and 14B represent lab data of one particular magnet configuration. A calibration point of 0 mils represents the position of the magnet as it was moved toward the target and sensing elements at which the bias provided by the magnet on the sensing elements permitted the sensor to digitally switch states. FIG. 14A represents data that was obtained using a block magnet and FIG. 14B represents data that was obtained using a beveled magnet. Calibration positions of 0, 4, 6, 8, 10 and 14 mils are represented by curves 90, 91, 92, 93, 94 and 95, respectively. By comparing the curves in FIGS. 14A and 14B, it can be seen that the switch point variation, as a function of airgap, is less for the beveled magnet than for the block magnet.

FIG. 14A represents the data that resulted when a conventional parallelepiped permanent magnet was used and FIG. 14B represents the results of the simulation when a beveled magnet was used. The reduction in switch point variation as a function of airgap variation is the primary advantage obtained by using the beveled magnet of the present invention.

FIGS. 14A and 14B show the results of several tests to determine the effects of varying the relative positions of magnet and sensor for various magnitudes of airgap. The vertical axes are measured in deviation from a tooth/slot transitional edge measured in millimeters of arc.

The present invention utilizes a beveled magnet to improve the operating characteristics of a magnetic sensor. Although certain specific data was described above to illustrate the advantages of the present invention, it should be understood that alternative magnitudes of dimensions P1 and P2 are within the scope of the present invention.

The embodiments of the invention in which an exclusive property or right is claimed are defined as follows:

1. A magnetic sensor, comprising:

a magnetically sensitive component having a sensing plane;

a permanent magnet having a first magnetic pole face, a second magnetic pole face and a magnetic axis extending perpendicularly through the planes of said first and second magnetic pole faces, said magnetically sensitive component being displaced from said magnetic axis with said sensing plane being disposed in parallel association with said magnetic axis and being rigidly attached to said permanent magnet, said permanent magnet having a beveled surface formed in a first end of said permanent magnet, said beveled surface intersecting said first pole face at a preselected angle, said beveled surface being disposed proximate said magnetically sensitive component; and a movable ferromagnetic object disposed for movement through detection zone proximate said magnetically sensitive component.

2. The magnetic sensor of claim 1, wherein:

said magnetically sensitive component comprises at least first and second magnetoresistive elements.

3. The magnetic sensor of claim 2, wherein:

said first magnetoresistive element comprises first and second magnetoresistors and said second magnetoresistive element comprises third and fourth magnetoresistors.

4. The magnetic sensor of claim 3, wherein:

said first, second, third and fourth magnetoresistors are connected in electrical communication with each other to form a Wheatstone bridge configuration.

5. The magnetic sensor of claim 4, wherein:

said first, second, third and fourth magnetoresistors are made of permalloy material.

6. The magnetic sensor of claim 1, wherein:

said ferromagnetic object is a tooth of a gear.

7. The magnetic sensor of claim 6, wherein:

said gear is rotatably attached to an automobile engine.

8. A magnetic sensor, comprising:

a magnetically sensitive component having a sensing plane, said magnetically sensitive component comprising at least first and second magnetoresistive elements, said first magnetoresistive element comprising first and second magnetoresistors and said second magnetoresistive element comprising third and fourth magnetoresistors;

a permanent magnet having a first magnetic pole face, a second magnetic pole face and a magnetic axis extending perpendicularly through the planes of said first and second magnetic pole faces, said magnetically sensitive component being displaced from said magnetic axis with said sensing plane being disposed in parallel association with said magnetic axis, said permanent magnet having a beveled surface formed in a first end of said permanent magnet, said beveled surface intersecting said first pole face at a preselected angle, said beveled surface being disposed proximate said magnetically sensitive component and a movable ferromagnetic object disposed for movement through a detection zone proximate said magnetically sensitive component.

9. The magnetic sensor of claim 8, wherein:

said first, second, third and fourth magnetoresistors are connected in electrical communication with each other to form a Wheatstone bridge configuration.

10. The magnetic sensor of claim 9, wherein:

said first, second, third and fourth magnetoresistors are made of permalloy material.

11. The magnetic sensor of claim 8, wherein:

said ferromagnetic object is a tooth of a gear.

12. The magnetic sensor of claim 11, wherein:

said gear is rotatably attached to an automobile engine.

13. A magnetic sensor, comprising:

a magnetically sensitive component having a sensing plane, said magnetically sensitive component comprising at least first and second magnetoresistive elements, said first magnetoresistive element comprising first and second magnetoresistors and said second magnetoresistive element comprising third and fourth magnetoresistors, said first, second, third and fourth magnetoresistors being connected in electrical communication with each other to form a Wheatstone bridge configuration;

a permanent magnet having a first magnetic pole face, a second magnetic pole face and a magnetic axis extending perpendicularly through the planes of said first and second magnetic pole faces, said magnetically sensitive component being displaced from said magnetic axis with said sensing plane being disposed in parallel association with said magnetic axis, said permanent magnet having a beveled surface formed in a first end of said permanent magnet, said beveled surface intersecting said first pole face at a preselected angle, said beveled surface being disposed proximate said magnetically sensitive component; and a movable ferromagnetic object disposed for movement through a detection zone proximate said magnetically sensitive component, said first, second, third and fourth magnetoresistors being made of permalloy material, said ferromagnetic object being a tooth of a gear, said gear being rotatably attached to an automobile engine.

\* \* \* \* \*